United States Patent [19]
Hirabayashi

[11] Patent Number: 5,295,925
[45] Date of Patent: Mar. 22, 1994

[54] PLANETARY GEAR TRANSMISSION

[75] Inventor: Kazumori Hirabayashi, Nagano, Japan

[73] Assignee: Harmonic Drive Systems, Inc., Tokyo, Japan

[21] Appl. No.: 976,939

[22] Filed: Nov. 18, 1992

[30] Foreign Application Priority Data

| Nov. 22, 1991 | [JP] | Japan | 3-104235 |
| Nov. 22, 1991 | [JP] | Japan | 3-104236 |
| Nov. 22, 1991 | [JP] | Japan | 3-104237 |
| Feb. 3, 1992 | [JP] | Japan | 4-010907 |

[51] Int. Cl.$^5$ .......................... F16H 1/28
[52] U.S. Cl. .................... 455/331; 475/337
[58] Field of Search .......... 475/219, 330, 331, 348, 475/903, 346; 384/495

[56] References Cited

U.S. PATENT DOCUMENTS

| 2,999,401 | 9/1961 | Bedard et al. | 475/331 X |
| 4,091,688 | 5/1978 | Huffman | 475/331 |

FOREIGN PATENT DOCUMENTS 2-38551 3/1990 Japan.
3-209038 9/1991 Japan.

Primary Examiner—Leslie A. Braun
Assistant Examiner—Khon Ta
Attorney, Agent, or Firm—Burns, Doane, Swecker & Mathis

[57] ABSTRACT

A two-stage planetary gear transmission having a first-stage planetary gear transmission and a second-stage planetary gear transmission is disclosed, wherein the carrier of the second-stage planetary gear transmission comprises first and second carrier parts integrally connected with each other. A hollow pinion shaft formed thereon with the sun gear of the second stage is rotationally supported on the first carrier part via a deep-channel ball bearing in a cantilevered condition. A carrier of the first stage for supporting planetary gears of the first stage is integrally formed on the end of the hollow pinion shaft of the second stage. A lubricant layer of about 15 μm to about 20 μm in width is formed between an inner race member of a planetary bearing and a planetary shaft for each of the planetary gears of the second stage. In addition, the gear ratio u1 of the first-stage planetary gear transmission is larger than the gear ratio u2 of the second-stage planetary gear transmission, and which is equal to or larger than about 5. According to the present invention, misalignment or improper meshing of the gears of the first stage can be adjusted by movement of the cantilevered pinion shaft of the second stage. Improper meshing of the planetary gears of the second stage can be adjusted by the lubricant layer. In addition, the noise from the planetary gear transmission can be reduced by setting the the gear ratios of the first and second stage as mentioned above.

5 Claims, 4 Drawing Sheets

PLANETARY GEAR TRANSMISSION

BACKGROUND OF THE INVENTION

1. Field of the Invention

This invention generally relates to a planetary gear transmission. More specifically, this invention pertains to a planetary gear transmission having a carrier comprised of divided carrier parts between which a sun gear and planetary gears are disposed.

2. Related Art Description

A planetary gear transmission having a divided-type carrier is disclosed in Japanese Patent Application No. HEI 2-2334 filed on Jan. 9, 1990 in the name of the same assignee of the present patent application. This planetary gear transmission has a sun gear, a plurality of planetary gears meshed with the sun gear, a carrier for supporting the planetary gears rotationally, and an internal gear meshed with the planetary gears. The carrier is constituted by first and second carrier parts positioned opposite in the axial direction, between which the sun and planetary gears are accommodated. The first and second carrier parts are fixed by a plurality of fastening bolts. The internal gear is formed circumferentially on the inner surface of a ring member. The ring member has inner surface portions on both sides of the internal gear portion. These inner surface portions support rotationally the first and second carrier parts via ball bearings, respectively.

In the planetary gear transmission of this type, the sun and planetary gears are accommodated inside the carrier parts and the internal gear, so that the axial length of the transmission can be reduced compared to other types of planetary gear transmissions. Further, it is dynamically advantageous that the carrier having first and second carrier parts is supported on both sides by the ring member via the ball bearings.

This invention is directed to improvements of a planetary gear transmission having a divided-type carrier.

One object of this invention is to provide a planetary gear transmission with a mechanism for equally distributing load among gear elements even if manufacturing errors or misalignment of the parts occur.

Another object of this invention is to lower the noise generated from a planetary gear transmission having a divided-type carrier.

Still another object of this invention is to produce a planetary gear transmission having a divided-type carrier compactly.

SUMMARY OF THE INVENTION

According to this invention, there is provided a two-stage planetary gear transmission having a first-stage planetary gear transmission and a second-stage planetary gear transmission, each of the first and second planetary gear transmissions comprising a sun gear, a plurality of planetary gears meshed with the sun gears, a carrier for supporting the planetary gears rotationally, and an internal gear meshed with the planetary gears. The carrier of the second-stage planetary gear transmission comprises first and second carrier parts integrally connected in a manner that they sandwich the planetary gears and sun gear of the second stage from both sides in the axial direction. The first carrier part positioned at the opposite side to the first-stage planetary gear transmission is rotationally supported on a casing formed thereon with the internal gear of the second stage, and a hollow pinion shaft formed thereon with the sun gear of the second stage is rotationally supported on the first carrier part via a deep-channel ball bearing in a cantilevered condition. The internal gear of the first stage is integrally formed on the second carrier, the carrier of the first stage is integrally formed on the end of the pinion shaft of the second stage, and the sun gear of the first stage is formed on a projected end of a pinion shaft of the first stage arranged extending through a hollow portion of the pinion shaft of the second stage.

In a preferred embodiment, the deep-channel ball bearing supports the pinion shaft of the second stage in a manner to prevent it from moving axially.

In another preferred embodiment, there is formed an annular gap of about 15 $\mu$m to about 20 $\mu$m in width between an inner race of a planetary bearing and a planetary shaft for each of the planetary gears of the second stage. A lubricant is filled in the annular gap to form a lubricant layer between the inner race and the planetary shaft.

In still another preferred embodiment, the gear ratio u1 of the first-stage planetary gear transmission is larger than the gear ratio u2 of the second-stage planetary gear transmission. Further, the gear ratio u1 is equal to or larger than about 5. It is preferable that the reduction gear ratio i of the transmission is equal to or less than about 16.

In another aspect of the present invention, there is provided a planetary gear transmission comprising a sun gear, a plurality of planetary gears meshed with the sun gears, a carrier for supporting the planetary gears rotationally, and an internal gear meshed with the planetary gears, wherein the carrier comprises first and second carrier parts integrally connected in a manner that they sandwitch the planetary gears and the sun gear from both sides in the axial direction. The first and second carrier parts are rotationally supported on the side of the internal gear via a cross roller bearing, and an inner race of the cross roller bearing is formed integrally on the first and second carrier parts. In a preferred embodiment, an annular gap of about 15 $\mu$m to about 20 $\mu$m in width is formed between an inner race of a planetary bearing and a planetary shaft for each of the planetary gears, and a lubricant is filled in the annular gap to form a lubricant layer between the inner race and the planetary shaft.

The above and other objects and advantages of this invention will be apparent from reading the following description in conjunction with the attached drawings.

PREFERRED EMBODIMENTS OF THE INVENTION

While the present invention will be described with reference to specific embodiments, it is understood that the present invention is not limited to these embodiments. On the contrary, it is intended to cover all alternatives, modifications and equivalents as may be included in the scope of the invention defined by the attached claims.

Figure 1:
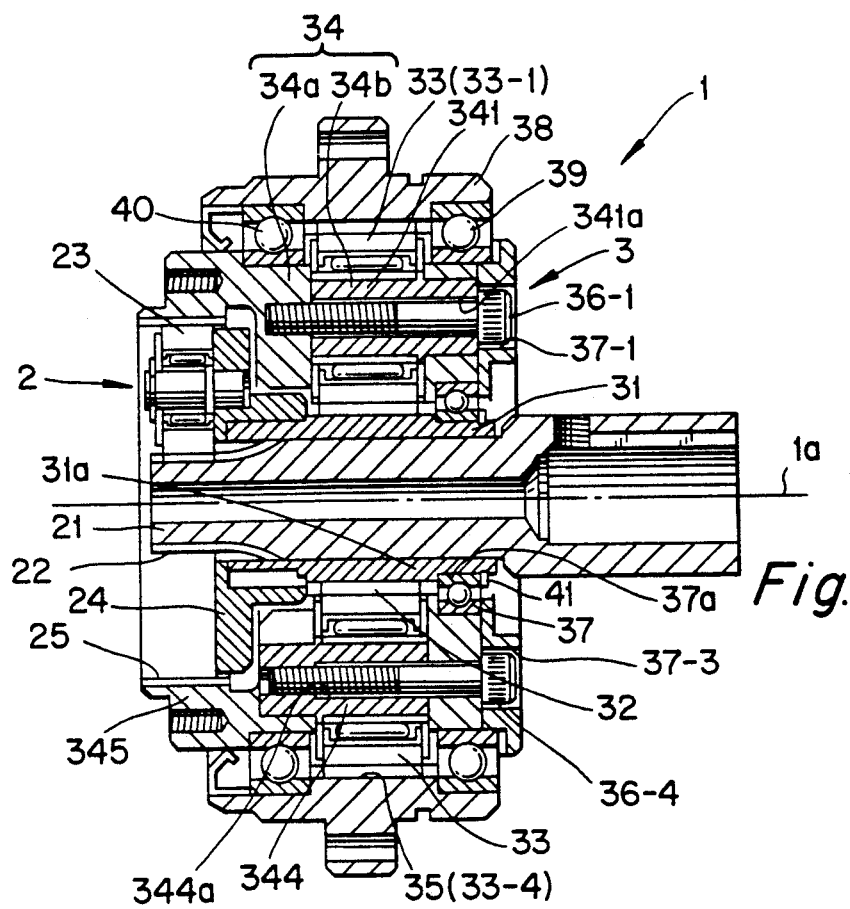
FIG. 1 is a cross-sectional view of an embodiment of a two-stage planetary gear transmission according to the present invention.
Figure 2:
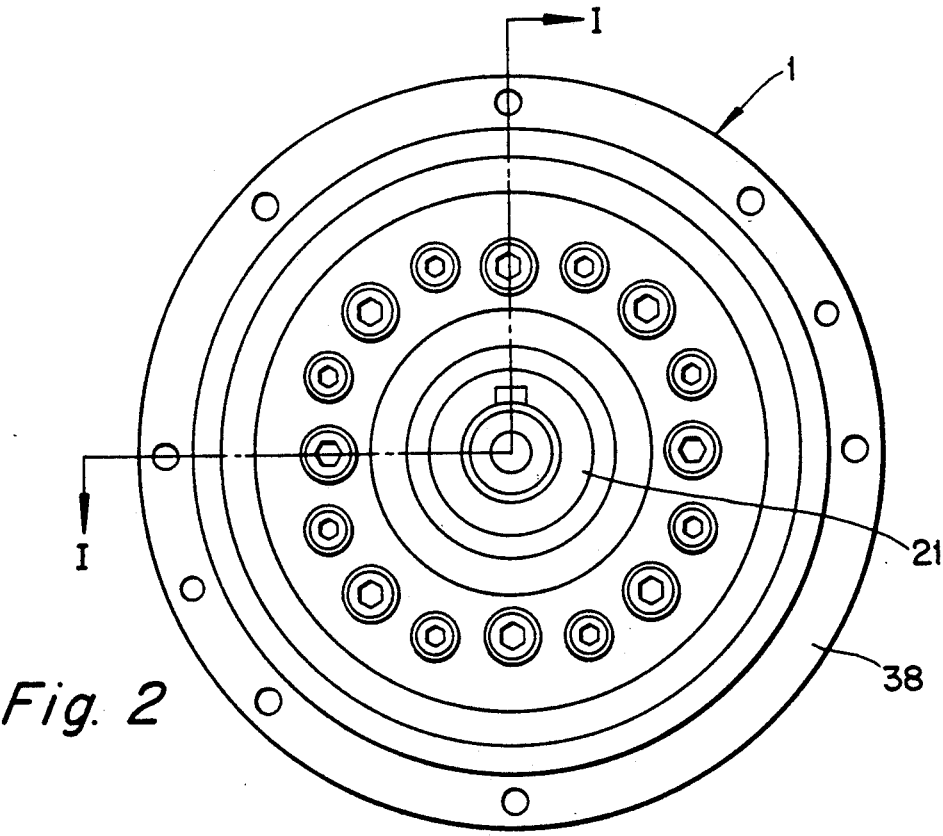
FIG. 2 is a schematical side view of the two-stage planetary gear transmission of FIG. 1.
Figure 3:
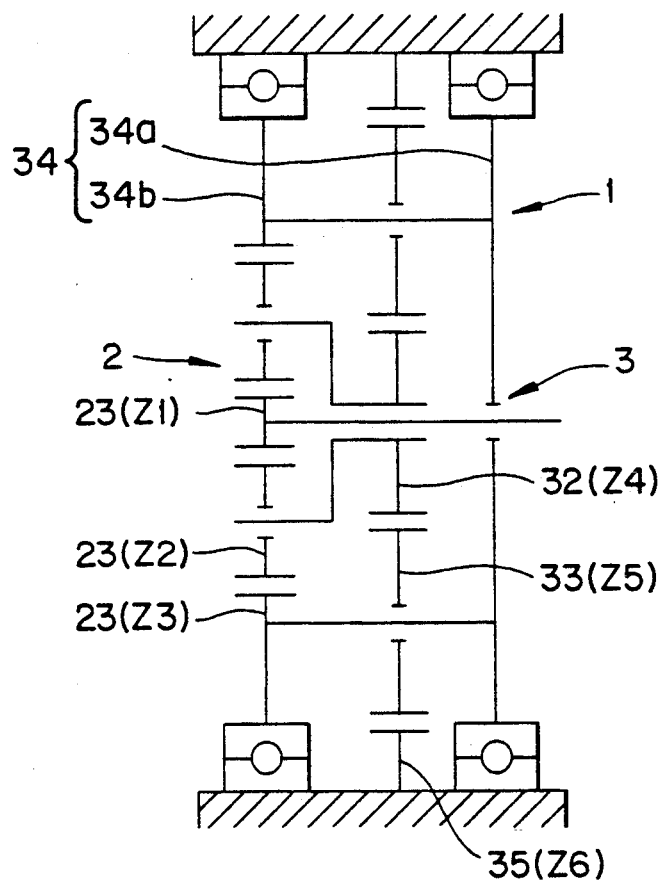
FIG. 3 illustrates a skeleton of the two-stage planetary gear transmission of FIG. 1.

Referring to FIGS. 1 to 3, a planetary gear transmission according to this invention will be described. The planetary gear transmission 1 of this embodiment is of the two-stage type having first and second stages of planetary gear transmissions which are arranged axially. The second-stage planetary gear transmission 3 has a carrier 34 of the divided type as mentioned below. The first-stage planetary gear transmission 2 has a carrier 24 which is connected to a sun gear 32 of the second-stage planetary gear transmission 3 in a manner that the carrier 24 rotates integrally with the sun gear 32. A first-stage internal gear 25 is connected to the second-stage carrier 34 so as to rotate integrally with each other. Thus, the reduction gear ratio i of the planetary gear transmission 1 is defined as follows (see FIG. 3):

$$i = (u1 + u2) \cdot u2 + 1$$

where
  $u1 = z3/z1$,
  $u2 = z6/z4$, z1 is the number of tooth of a sun gear of the first stage, z2 is the number of tooth of planetary gears of the first stage, z3 is the number of tooth of an internal gear of the first stage, z4 is the number of tooth of a sun gear of the second stage, z5 is the number of tooth of planetary gears of the second stage, and z6 is the number of tooth of an internal gear of the second stage, The structure of the planetary gear transmission 1 will be explained. The second-stage planetary gear transmission 3 comprises a sun gear 32 formed on a hollow pinion shaft 31, four planetary gears 33 (33-1 to 33-4) meshed with the sun gear 32, a carrier 34 for supporting the planetary gears rotationally, and an internal gear 35 meshed with the planetary gears 33. The internal gear 35 is formed on the center portion of the inner surface of a ring-shaped casing 38.

The carrier 34 is constituted by a first carrier part 34a positioned at the side of the first-stage planetary gear transmission 2 and a second carrier part 34b positioned at the opposite side. The first carrier part 34a has planetary shafts 341 and 343 at the inner end facing the second carrier part 34b (In FIG. 1, only the shaft 341 is shown.). The planetary shafts 341 and 343 are positioned diametrically and extending axially. Likewise, the second carrier part 34b has planetary shafts 342 and 344 which are positioned along a diameter perpendicular to the diameter on which the shaft portions 341 and 344 are positioned (In FIG. 1, only the shaft portion 343 is shown.). The planetary gears 33-1 to 33-4 are respectively supported on the planetary shafts 341 to 344 rotationally. The planetary shafts 341 to 344 are respectively provided with bolt holes 341a to 344a for accepting fastening bolts 36 (36-1 to 36-4), and the second carrier part 34b is also formed with holes 37 (37-1 to 37-4) positioned coaxially with the respective bolt holes 341a to 344a. The fastening bolts 36 are inserted through the holes 37 and the bolt holes 341a to 344a, whereby the carrier parts 34a and 34b are fixedly attached with each other. The carrier parts 34a and 34b connected integrally with each other are supported rotationally on the inner surface of the ring-shaped casing 38 via ball bearings 39 and 40, respectively.

A deep-channel ball bearing 37 is inserted between the inner surface of the second carrier part 34b and the proximal outer surface of the hollow pinion shaft 31. By this, the the hollow pinion shaft 31 is supported rotationally on the second carrier part 34b. The seat portion for the ball bearing 37, which is formed on the shaft 31, is diametrically reduced compared to the end-side portion of the shaft 31, whereby a stepped portion 31a is formed circumferentially on the shaft 31. An inner race 37a of the ball bearing 37 abuts against the stepped portion 31a. Adjacent to the opposite side of the inner race 37a, a stoping ring 41 is attached on the shaft 31 so as to prevent the ball bearing from falling off the shaft 31.

On the other hand, the first-stage planetary gear transmission 2 comprises a sun gear 22, three planetary gears 23 (23-1 to 23-3) meshed with the sun gear 22, a carrier 24 for supporting the planetary gears rotationally, and an internal gear 25 meshed with the planetary gears. A pinion shaft 21 extends rotationally through the hollow pinion shaft 31. The end portion of the pinion shaft 21 projects from the hollow pinion shaft 31, on which the sun gear 21 is formed circumferentially. The carrier 23 for supporting the planetary gears 23 is fixed on the end of the hollow shaft 31 so as to rotate integrally with each other. The internal gear 25 is formed on an inner surface of a ring-shaped projection 345 which is formed integrally on the end of the first carrier part 34a of the second-stage carrier 34.

In operation, the casing 38 formed thereon with the second-stage internal gear 35 is set stationarily. A high rotational speed is input through the first-stage pinion shaft 21, and a reduced rotational speed is output from the first-stage internal gear 25 (the second-stage carrier 34).

According to the two-stage planetary gear transmission 1 of the present embodiment, the hollow pinion shaft 31 is rotationally supported by the second-stage carrier 34 via the deep-channel ball bearing 37 in a cantilevered condition. This means that the distal end of the second-stage pinion shaft 31 is in a free condition in a radial direction. Thus, even if the respective gear parts are assembled improperly, the free end of the pinion shaft 31 is forced to shift radially when a load is applied on the gears, to thereby adjust improper meshing of the gears. Accordingly, proper meshing among the gears is obtained, so that the load is equally distributed among the gears.

On the other hand, the hollow pinion shaft 31 is prevented from moving axially by engagements of the ball bearing 37 with the stepped portion 31a and with the stopping ring 41. Thus, according to the present embodiment, there is no need to provide another member to prevent the first-stage planetary gear transmission connected on the end of the shaft 31 from moving in the axial direction.

Figure 4:
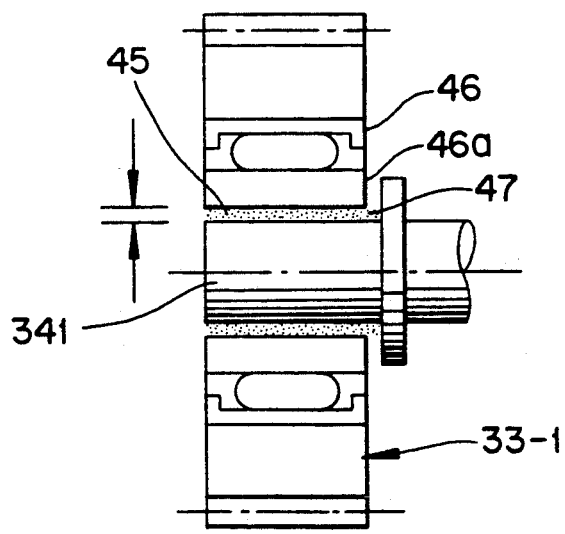
FIG. 4 illustrates schematically the supporting mechanism of a planetary gear of the planetary gear transmission of FIG. 1.

FIG. 4 illustrates the first-stage planetary gear 33-1 supported on the planetary shaft 341. As shown in this drawing, an annular gap 45 is formed between the planetary shaft 341 and the inner race 46a of a needle bearing 46. In a typical planetary gear transmission, the inner race 46a of the bearing 46 is fixed on the planetary shaft 341 by shrink fitting, press fitting or the like. However, according to the present embodiment, the inner race 46a and the planetary shaft 341 are manufactured such that the inner diameter of the inner race 46a is about 15 μm to 20 μm larger than the outer diameter of the planetary shaft 341. Thus, when assembled, there is formed the annular gap 45 having about 15 to 20 μm in width between them. A lubricant is filled in the annular gap 45 to thereby form a lubricant-film layer 47 between the inner race 46a and the planetary shaft 341. The remaining planetary gears 33-2 to 33-4 are similarly supported on the planetary shafts 342 to 344, respectively.

Accordingly, each of the planetary gears 33-1 to 33-4 is rotationally supported on each of the planetary shafts 341 to 344 in a floating condition by the lubricant layer. Where the planetary gears are misaligned due to manufacturing errors, a load applied on the gears can be transferred in an imbalanced condition among the gears. When the imbalanced loading occurs, the planetary gears floatingly supported on the planetary shafts are forced to shift radially to proper positions so as to establish a proper load-transferring condition. In other words, load equally distributing condition is established among the gears.

Next, according to the two-stage planetary gear transmission 1 of the present embodiment, the reduction gear ratio i is set 16. The gear ratio u1 of the first-stage planetary gear transmission 2 is 5, whereas the gear ratio u2 of the second-stage planetary gear transmission 3 is 2.5. The noise level of the present two-stage planetary transmission 1 was calculated. For comparison, a two-stage planetary transmission was manufactured which has the same structure as that of the present planetary gear transmission 1 except that the gear ratios u1 and u2 of the first and second stages were set 4 and 3, respectively. The noise level of the two-stage transmission for comparison was also calculated. The noise calculations of the respective planetary gear transmissions are shown in Table 1.

TABLE 1

|  | Planetary Gear Transmission of the Present Embodiment | Planetary Gear Transmission for comparison |
| --- | --- | --- |
| Reduction Gear Ratio(i) | 16 | 16 |
| Gear Ratio of First Stage (u1) | 5 | 4 |
| Gear Ratio of Second Stage(u2) | 2.5 | 3 |
| Noise Calculation (dB) | 70 | 75 |

As can be seen from Table 1, the noise level of the planetary gear transmission 1 of the present embodiment is extremely low in comparison with that of the planetary gear transmission for comparison. According to analysis conducted by the inventor of the present invention et. al., it has been found that the noise level of the planetary gear transmission can be suppressed by setting the gear ratio u1 of the first stage larger than the gear ratio u2 and larger than about 5. According to the present embodiment, the number of tooth of the sun gear of the first stage can be reduced without changing the reduction gear ratio. Therefore, the diameter of the sun gear can be reduced accordingly. Thus, the noise generated from the transmission can be suppressed.

Figure 5:
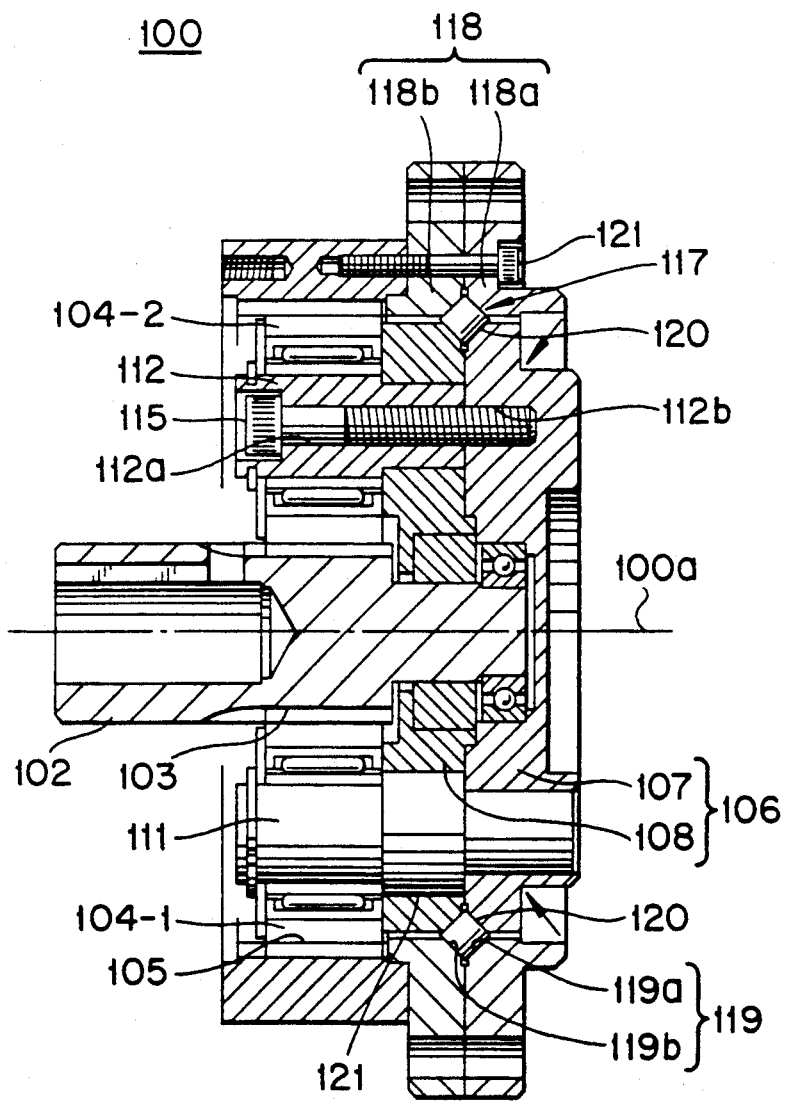
FIG. 5 is a cross-sectional view of another embodiment of a planetary gear transmission according to the present invention; and, FIG. 6 is a schematical side view of the planetary gear transmission of FIG. 5.
Figure 6:
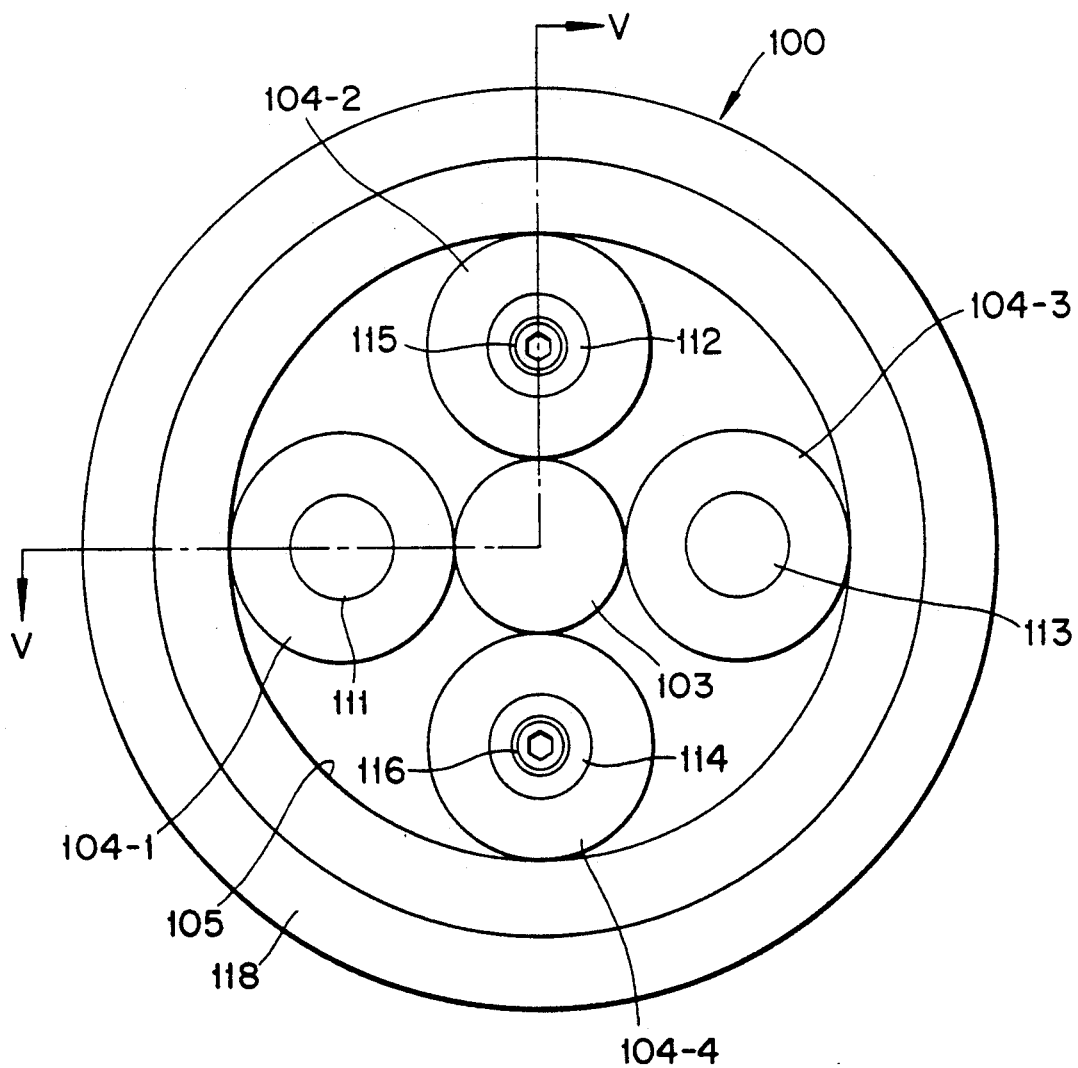

FIGS. 5 and 6 show an embodiment of a single-stage planetary gear transmission according to the present invention.

The planetary gear transmission 100 of this embodiment has a sun gear 103 formed on an input pinion shaft 102, four planetary gears 104-1 to 104-4 meshed with the sun gear 103, an internal gear 105 meshed with the planetary gears 104-1 to 104-4, and a carrier 106 of the divided type. The carrier 106 is constituted by a first carrier part 107 of a disk shape and a second carrier part 108 of a ring shape.

The first carrier part 107 is formed integrally with two planetary shafts 111 and 113 for supporting the planetary gears 104-1 and 104-3 positioned diametrically. In FIG. 5, only the shaft 111 is shown. The planetary shafts 111 and 113 extend along the axis 100a to penetrate through-holes 121 and 123 formed in the second carrier part 108, respectively. In FIG. 5, only the though-hole 121 is shown. The planetary gears 104-1 and 104-3 are supported rotationally on the ends of the respective planetary shafts 111, 113 projecting from the through-holes 121, 123.

The second carrier part 108, on the other hand, is formed integrally with the remaining two planetary shafts 112 and 114 extending the same direction as that of the planetary shafts 111, 113, around which the planetary gears 104-2 and 104-4 are supported rotationally. The planetary shafts 112 and 114 are formed therein with bolt holes 112a and 114a extending axially. In FIG. 5, only the planetary shaft 112 and the associated bolt hole 112a are shown. The first carrier part 107 is formed with bolt holes 112b and 114b positioned coaxially with the bolt holes 112a and 114a (In FIG. 5, only the bolt hole 112b is shown.). Fastening bolts 115 and 116 are screwed in the holes 112a, 112b and 114a, 114b from the outer-end side of the second carrier part 108 to fasten the carrier parts 107 and 108 integrally with each other.

The thus formed carrier 106 of the divided type is rotationally supported on the side of the internal gear 105 via a cross roller bearing 117. The cross roller bearing 117 comprises an outer race member 118 of the divided type having a first outer race member 118a and a second outer race member 118b which are connected to a circular end of the internal gear 105 by a plurality of fastening bolts 121. On the other hand, an inner race 19 of the cross roller bearing 117 is also of the divided type having a first inner race member and a second race member. As shown in FIG. 5, the first carrier part 107 is used as the first inner race member of the bearing 117, while the second carrier part 108 is as the second inner race member thereof. That is, the outer surfaces of the first and second carrier parts 107, 118 are formed with roller races 119a and 119b, respectively. Between the outer race member 118 and the inner race member 119, a plurality of rollers 120 are arranged.

In the present embodiment, only one cross roller bearing 117 is used for rotationally supporting the divided-type carrier 106 on the side of the internal gear 105. In addition, the respective carrier parts 107 and 108 are used as the inner race 119 of the cross roller bearing 117. In other words, there is no need to provide two or more bearings for supporting the divided-type carrier, or to provide another member for the inner race of the bearing. Accordingly, the number of the parts for assembling the planetary gear transmission can be reduced, whereby the planetary gear transmission can be made compact in both the axial and diametrical directions. Further, according to the present embodiment, there is no need to provide a shim or the like to eliminate looseness in the thrust direction.

I claim:

1. A two-stage planetary gear transmission having a first-stage planetary gear transmission and a second-stage planetary gear transmission, each of said first and second planetary gear transmissions comprising a sun gear, a plurality of planetary gears meshed with said gun gears, a carrier for supporting said planetary gears rotationally, and an internal gear meshed with said planetary gears, wherein,
   said carrier of the second-stage planetary gear transmission comprises first and second carrier parts integrally connected so that they sandwich said planetary gears and said sun gear of the second stage from both sides in an axial direction, said first carrier part positioned at the opposite side to said first planetary gear transmission is rotationally supported on a casing formed thereon with said internal gear of the second stage, and a hollow pinion shaft formed thereon with said gun gear of the second stage is rotationally supported on said first carrier part via a ball bearing in a cantilevered condition, wherein,
   said internal gear of the first stage is integrally formed on said carrier of the second-stage, said carrier of the first stage is integrally formed on the end of said hollow pinion stage of the second stage, and said sun gear of the first stage is formed on a projected end of a pinion shaft of the first stage arranged extending through a hollow portion of said hollow pinion shaft of the second stage;
   wherein said ball bearing is arranged so as to support said hollow pinion shaft of the second stage to prevent it from moving axially,
   wherein an annular gap of about 15 $\mu$m to about 20 $\mu$m in width is formed between an inner race member of a planetary bearing and a planetary shaft for each of said planetary gears of the second stage, and a lubricant is filled in said annular gap to form a lubricant layer between said inner race member and said planetary shaft,
   wherein a gear ratio u1 between an input and output of said first-stage planetary gear transmission is larger than a gear ratio u2 between an input and output of said second-stage planetary gear transmission, and wherein said gear ratio u1 is equal to or larger than about 5,
   wherein the reduction gear ratio i of the two-stage planetary gear transmission thereof is defined by $$(u1+1)\cdot u2+1$$

and which is equal to or less than about 16.

2. A two-stage planetary gear transmission having a first-stage planetary gear transmission and a second-stage planetary gear transmission, each of said first and second planetary gear transmissions comprising a sun gear, a plurality of planetary gears meshed with said gun gears, a carrier for supporting said planetary gears rotationally, and an internal gear meshed with said planetary gears, wherein
   said carrier of the second-stage planetary gear transmission comprises first and second carrier parts integrally connected so that they sandwich said planetary gears and said sun gear of the second stage from both sides in the axial direction,
   wherein a gear ratio u1 between an input and output of said first-stage planetary gear transmission is larger than a gear ratio u2 between an input and output of said second-stage planetary gear transmission, and which is equal to or larger than about 5,
   wherein the reduction gear ratio i of the two-stage planetary gear transmission thereof is defined by $$(u1+1)\cdot u2+1$$

and which is equal to or less than about 16.

3. A two-stage planetary gear transmission as set forth in claim 2, wherein an annular gap of about 15 $\mu$m to about 20 $\mu$m in width is formed between an inner race member of a planetary bearing and a planetary shaft for each of said planetary gears of the second stage, and a lubricant is filled in said annular gap to form a lubricant layer between said inner race member and said planetary shaft.

4. A planetary gear transmission comprising a sun gear, a plurality of planetary gears meshed with said sun gear, a carrier for supporting said planetary gears rotationally, and an internal gear meshed with said planetary gears, wherein
   said carrier comprises first and second carrier parts connected respectively to first and second ones of said plurality of said planetary gears, and wherein
   said first and second carrier parts are rotationally supported on one side of said internal gear via a cross roller bearing, and an inner race of said cross roller bearing is formed integrally on said first and second carrier parts.

5. A planetary gear transmission as set forth in claim 4, wherein an annular gap of about 15 $\mu$m to about 20 $\mu$m in width is formed between an inner race member of a planetary bearing and a planetary shaft for each of said planetary gears, and a lubricant is filled in said annular gap to form a lubricant layer between said inner race member and said planetary shaft.

* * * * *